(12) United States Patent
Philipps

(10) Patent No.: US 6,285,648 B1
(45) Date of Patent: Sep. 4, 2001

(54) DEVICE FOR TURNING DOUBLE-SIDED INFORMATION CARRIERS IN AN APPARATUS

(75) Inventor: Bernd Philipps, Untergruppenbach (DE)

(73) Assignee: BDT Büro-und Datentechnik, Rottweil (DE)

( * ) Notice: Subject to any disclaimer, the term of this patent is extended or adjusted under 35 U.S.C. 154(b) by 0 days.

(21) Appl. No.: 09/252,843

(22) Filed: Feb. 19, 1999

(30) Foreign Application Priority Data

Feb. 21, 1998 (DE) .............................. 198 07 419

(51) Int. Cl.[7] ............... G11B 17/04; G11B 17/22
(52) U.S. Cl. ............................. 369/200; 369/195
(58) Field of Search ................... 369/36, 38, 178, 369/191–194, 195, 199, 200

(56) References Cited

U.S. PATENT DOCUMENTS

| | | | |
|---|---|---|---|
| 4,271,440 | * | 6/1981 | Jenkins et al. ............... 360/92 |
| 4,754,397 | * | 6/1988 | Varaiya et al. . |
| 4,787,074 | * | 11/1988 | Deck et al. ................. 369/36 |
| 4,815,055 | * | 3/1989 | Fago, Jr. .................... 369/36 |
| 4,817,070 | * | 3/1989 | Hug et al. ................... 369/36 |
| 4,998,232 | * | 3/1991 | Methlie et al. ............... 369/36 |
| 5,010,536 | * | 4/1991 | Wanger et al. ............... 369/36 |
| 5,033,038 | * | 7/1991 | Kobayashi et al. ............ 369/36 |
| 5,036,503 | * | 7/1991 | Tomita ........................ 369/36 |
| 5,206,845 | * | 4/1993 | Baxter et al. ................. 369/34 |
| 5,220,548 | * | 6/1993 | Nakatsukasa et al. ........ 369/36 |
| 5,502,697 | * | 3/1996 | Taki ............................ 369/34 |
| 5,798,997 | * | 8/1998 | Ware et al. ................ 369/75.2 |
| 5,995,459 | * | 11/1999 | Kappel et al. ................ 369/36 |

* cited by examiner

*Primary Examiner*—William Klimowicz
(74) *Attorney, Agent, or Firm*—Foley & Lardner; Bernard L. Kleinke

(57) ABSTRACT

The invention relates to a turning device for turning double-sided information carriers such as Compact Discs, in an apparatus having at least one tray carrying an individual information carrier and removable from at least one function unit such as a magaine (3) and/or a playback/recording drive. The invention has a simple and compact design, and is energy-saving and freely configurable to ensure dependable and fast operation in an automatic environment. The turning device is arranged stationary inside the apparatus near the function units and is accommodated in its own housing or holding frame is changeably installable in a predetermined holder or in one of the holders for the function units. The holding device (1) has a turning mechanism in which is arranged a turning frame for turning (in Z direction) of a supplied information carrier, and furthermore two trays positioned one above the other and facing one another with their storage recesses and permanently remaining inside the turning mechanism frame are arranged inside the turning frame and are alternately movable by the conveying means of the apparatus out of the turning frame (in X direction) near a gripper of the apparatus and back (in Y direction.)

12 Claims, 5 Drawing Sheets

DEVICE FOR TURNING DOUBLE-SIDED INFORMATION CARRIERS IN AN APPARATUS

CROSS-REFERENCE TO RELATED APPLICATIONS

This application is based on co-pending German Patent Application 19807 419.0 filed Feb. 21, 1998.

STATEMENT REGARDING FEDERALLY SPONSORED RESEARCH OR DEVELOPMENT

Not Applicable

REFERENCE TO A "MICROFICHE APPENDIX"

Not Applicable

BACKGROUND OF THE INVENTION

1. Technical Field

The invention relates to a device for turning double-sided information carriers, such as Compact Discs, in an apparatus having at least one tray carrying an individual information carrier and removable from at least one function unit, such as a magazine and/or a playback/recording drive.

2. Background Art

A conventional turning device is disclosed in U.S. Pat. No. 5,247,408 and is arranged on a carrier movable in the vertical direction by a transport mechanism and on which are provided two conveying means for conveying trays carrying Compact Discs (CD's) into and out of a magazine and/or playback/recording drive. A gripper enables the removing/inserting of the CD's into and out of a storage recess of the tray. The trays are permanently assigned to the magazine and to the playback/recording drive, i.e. they cannot be removed from their receiving compartments. The turning device has a motor-driven drum horizontally aligned in its rotary axis that is rotatble or swivelable. On the front of the drum, the gripper is arranged on an eccentrically mounted holder. The gripper is disposed on the holder arranged transversely to the conveying direction of the tray and disposed either above or below this tray in the rotation center point of the inserted CD, such that by lifting or lowering the gripper by means of the transport mechanism the CD is grippable through its central hole by the gripper and removable from the storage recess of the tray. In order to perform a removal/insertion from underneath the tray, each tray has on its bottom an open slot extending from the central hole of the CD in the conveying direction of the tray, such that the tray can be freely moved into and out of the vicinity of the gripper when the CD has been gripped and lifted.

The disadvantages here are that the transport mechanism must be more powerful since both the turning device and the two conveying means must be conveyed or activated. The second conveying means is necessary because the CD is gripped from both above and below, and the apparatus's configurability is restricted, since the turning device is a non-changeable part of the transport mechanism. A further drawback is that for turning a CD, it must be picked up by the gripper either from above or below, and then lifted. The tray must then be conveyed by the lower and upper conveying means, before and after turning of the CD, into and out of the magazine or playback/recording drive, which entails a complicated and time-consuming operating sequence.

A conventional turning device is disclosed in European patent EP-0 717 405-A2 and is arranged on a carrier movable by a transport mechanism in the vertical direction and having a turning frame. Two conveying means are also arranged on the carrier. The first conveying means is used for conveying trays carrying Compact Discs (CD's) from at least one magazine and/or playback/recording drive to the turning frame. The CD-carrying trays are individually removable from the receiving compartments of the magazines and transportably held inside the turning frame to the playback/recording drive(s) and back by the transport mechanism. The second conveying means is intended for conveying an empty tray arranged upside down underneath the magazines to a position above the CD-carrying tray in the turning frame, such that when the turning frame swivels by 180° transversely to the conveying direction of the tray the CD is transferable under its own weight from a tray which is then on top to a tray which is underneath it.

Drawbacks of such an arrangement relate to the transport mechanism being configured more powerfully on account of the additionally transported turning device with two trays and the two conveying means. Also, a second conveying means is necessary since the empty tray must be conveyed up into the turning frame. Furthermore, the apparatus's configurability is restricted, since the turning device is a non-changeable part of the transport mechanism. A further disadvantage is that an additional empty inverted tray with an additional receiving compartment in the vicinity of the magazines or playback/recording drives is necessary, and that the trays of the magazines and of the playback/recording drives must be of identical design to assure their interchangeability.

SUMMARY OF THE INVENTION

An object of the present invention is therefore to provide a device having a simple and compact configuration and permitting a simple, compact, energy-saving and freely configurable apparatus design, which ensures dependable and fast operation in an automatic environment.

Briefly, in accordance with the invention, the turning device is arranged in a stationary manner inside the apparatus in the vicinity of the function unit(s).

Advantageously, the turning device accommodated in its own housing or holding frame is changeably installable in a predetermined holder or in one of the holders of the function units.

In another advantageous form of the invention, the turning device has turning means in which is arranged a turning frame for turning a supplied information carrier. Two trays are arranged in the turning frame with one being disposed above the other. They face each other with their storage recesses and remain permanently inside the turning frame. They are conveyable by means of a conveying means of the apparatus out of the turning frame into the range of a gripper of the apparatus and then back.

Advantageously, the turning frame is transportable along the conveying direction of the tray out of the housing and back by means of a spindle drive. The frame is rotatable or swivelable about a longitudinal axis of the spindle drive in the moved-out end position 180° steps. In the case of the trays moved into the turning frame, the information carrier inside a storage recess of a lower first tray is transferable during rotation or swiveling of the turning frame from the upward-swiveled first tray to the downward-swiveled second tray by its own weight. The tray currently underneath and in a predetermined horizontal working position, is movable out of the turning frame by means of the conveying means when the turning frame is moved in before and after turning. In this manner, an information carrier an be removed from and/or placed inside the storage recess of the tray by means of the gripper.

BRIEF DESCRIPTION OF DRAWINGS

The above mentioned and other objects and features of this invention and the manner of attaining them will become apparent, and the invention itself will be best understood by reference to the following description of the embodiment of the invention in conjunction with the accompanying drawings, wherein:

FIG. 4 illustrates the device according to FIG. 2 and 3 in a position with the turning frame again completely swiveled into the initial position and ready for moving in.

BEST MODE FOR CARRYING OUT THE INVENTION

Figure 1:
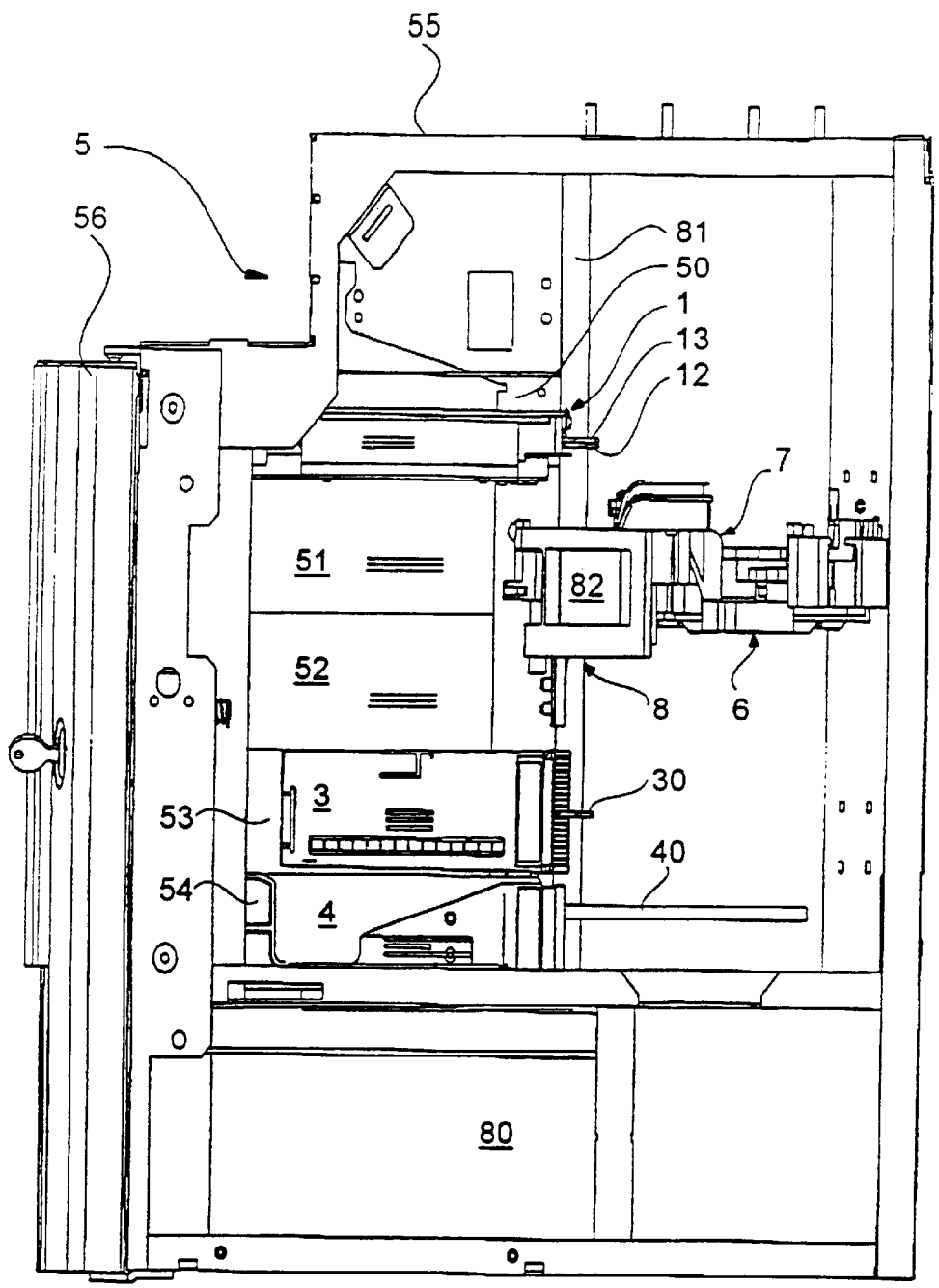
FIG. 1 illustrates the device in accordance with the invention and function units or components such as magazine, playback/recording drive and gripping/conveying/transporting device for information carriers carried on trays installed in an apparatus, in a side elevational view with the side wall of the apparatus removed.

Referring to FIGS. 1 to 5, device 1 in accordance with the invention turns double-sided information carriers 2 in an apparatus 5 with several trays 30; 40 each carrying a single information carrier and movable out of several function units 3; 4 of the apparatus 5.

The apparatus 5 is configured as a playback and/or recording apparatus for information carriers 2 in the form of Compact Discs. As shown in FIG. 1, the apparatus 5 is equipped with function units in the form of the magazine 3 and the playback/recording drive 4, with a transport mechanism 8 carrying a conveying means or device 6 and a gripper 7, and with the turning device 1. The magazine 3 here has several trays 30 disposed one above the other and the playback/recording drive 4 has a single tray 40, with these trays being firmly associated and permanently remaining inside these function units 3; 4, and not removable from the latter. The conveying device 6 moves the trays in and out, and the gripper 7 picks up a Compact Disc 2 from a moved-out tray. The device 6 is mounted on a carrier or slide 82 of the transport mechanism 8. A transport spindle 81 driven by a transport drive 80 is movable up and down in front of the input/output openings of the function units 3;4 and the turning device 1 vertically and longitudinally along the transport spindle 81. A Compact Disc 2 gripped by the gripper 7 is therefore supplyable from the magazine 3 to the turning device 1 for turning and/or to the playback/recording drive for playback/recording of information (data, music etc.) and returnable back to the magazine. The detailed structure and the functions of the magazine 3, of the conveying means 6, gripper 7 and transport mechanism 8 are shown in the published patent applications DE 196 12 380-A1, DE-196 23 124-A1 and DE 196 23 125-A1, which are each incorporated herein by reference.

As shown in FIG. 1, the function units 3; 4, are inserted into two lower holders 53, 54 of a set of five holders 50, 51, 52, 53, 54 arranged one above the other, and the turning device 1 into a top holder 50 and hence stationary or fixed in the apparatus 5, with the function units 3; 4 and the turning device 1 being aligned with their input/output openings for the Compact Disc-carrying trays in a vertically positioned front side facing the conveying means/gripper 6,7. The turning device 1 and the function units 3;4 are here changeably installed in the holders of the apparatus 5, i.e. they can, after opening of an apparatus door 56 on the apparatus housing 55 and after disconnection from a microprocessor-controlled apparatus control unit or from electrically plugged-in connection lines (not shown), be removed from their holders 50, 53, 54 or re-inserted into other holders, for example into holders 51, 52, 54 of the apparatus 5. The apparatus 5 is hence configurable with function units of different numbers and designs to suit the respective requirements.

To permit the changeability of the turning device 1 and/or of the function units 3;4 in a simply and dependably manner, the turning device 1 and the function units 3;4 have, as shown in FIGS. 1 to 4, in each case their own housing 10 or holding frame 10 on which are mounted guiding/holding/locking means (not shown) matching the holders 50–54 of the apparatus 5, these locking means being unlockable manually or by means of a tool.

In an alternative embodiment (not shown), a function unit in the form of an input/output drawer for Compact Discs is arranged above the turning device 1, with only a playback/recording drive 4 being provided in the apparatus 5, but no magazine 3. In a further alternative, not shown, the apparatus 5 has a non-changeable turning device 1 without its own housing and one or more non-changeable magazines 3 and/or one or more playback/recording drives.

It will become apparent to a person skilled in the art that the inventive device can also be used in other apparatus, such as archiving apparatus without playback/recording drives 4 or in apparatus with magazines and playback/recording drives but without trays, where in the latter case the information carriers must be held or spaced in the magazine and playback/recording drive such that they can be gripped by the gripping element of the gripper 7 as in the turning device in accordance with the invention, for example the Compact Disc with its central hole. Furthermore, it is obvious for the person skilled in the art that the turning device can also be used for other types of information carrier, for example floppy disks, diskettes or music cassettes.

The turning device 1 in accordance with the invention has in its housing 10, as shown in FIGS. 2 to 5, turning means that include a turning frame 11 for turning a supplied Compact Disc 2 (CD). The turning frame 11 is here arranged movable in/out and rotatable in a horizontal alignment inside the housing 10. Two trays 12; 13 positioned one above the other and facing one another with their storage recesses 12.1; 13 (see FIG. 5) are permanently held in the turning frame 11. The trays are alternately movable by means of the conveying means 6 of the apparatus 5 out of the turning frame 11 now inside the housing 10, horizontally in the direction X into the vicinity of the gripper 7 of the apparatus and horizontally back in the direction Y.

Figure 3:
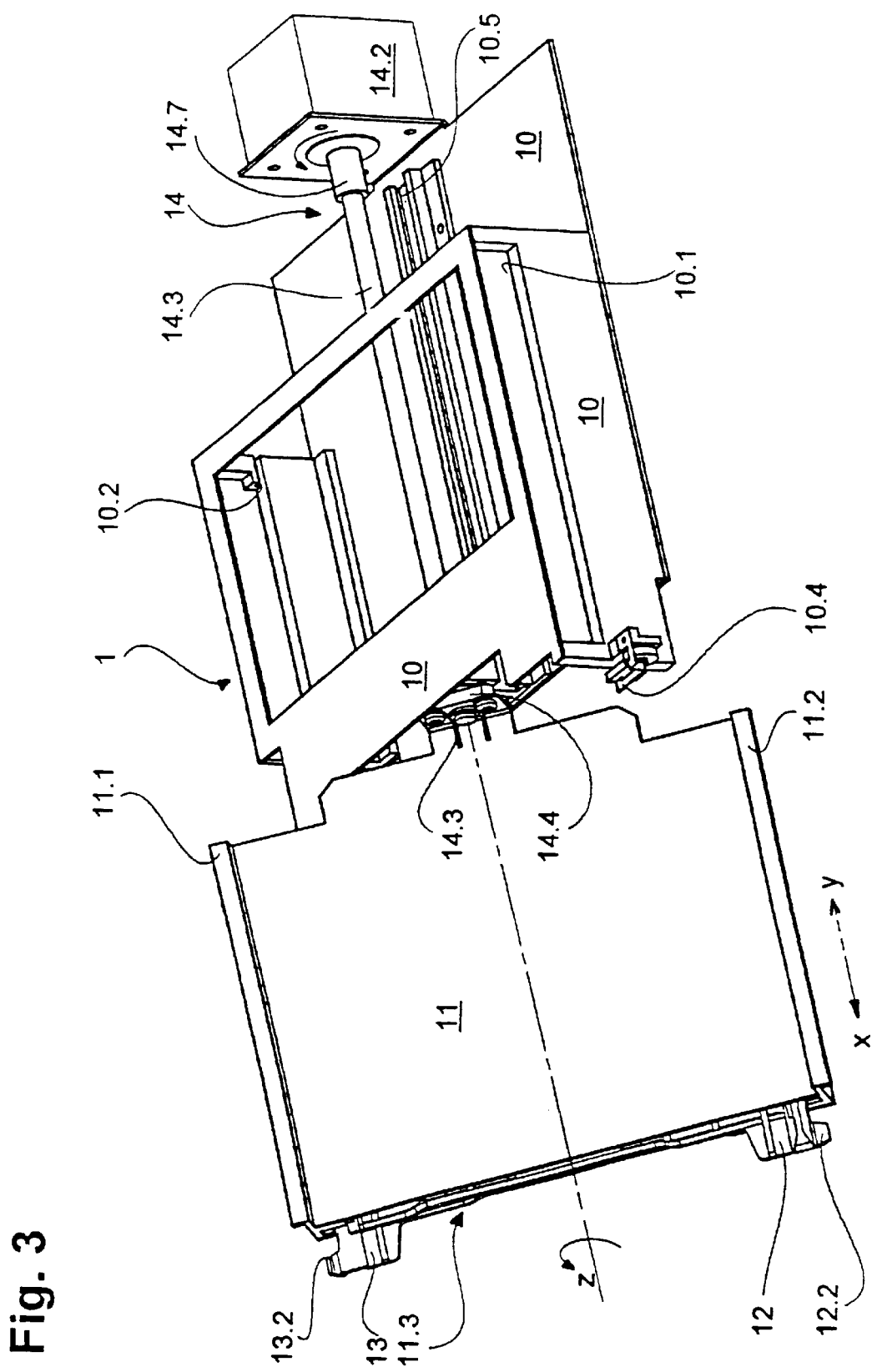
FIG. 3 illustrates the device according to FIG. 2 in a position during turning of an information carrier with the turning frame partially swiveled outside the housing of the device.
Figure 4:
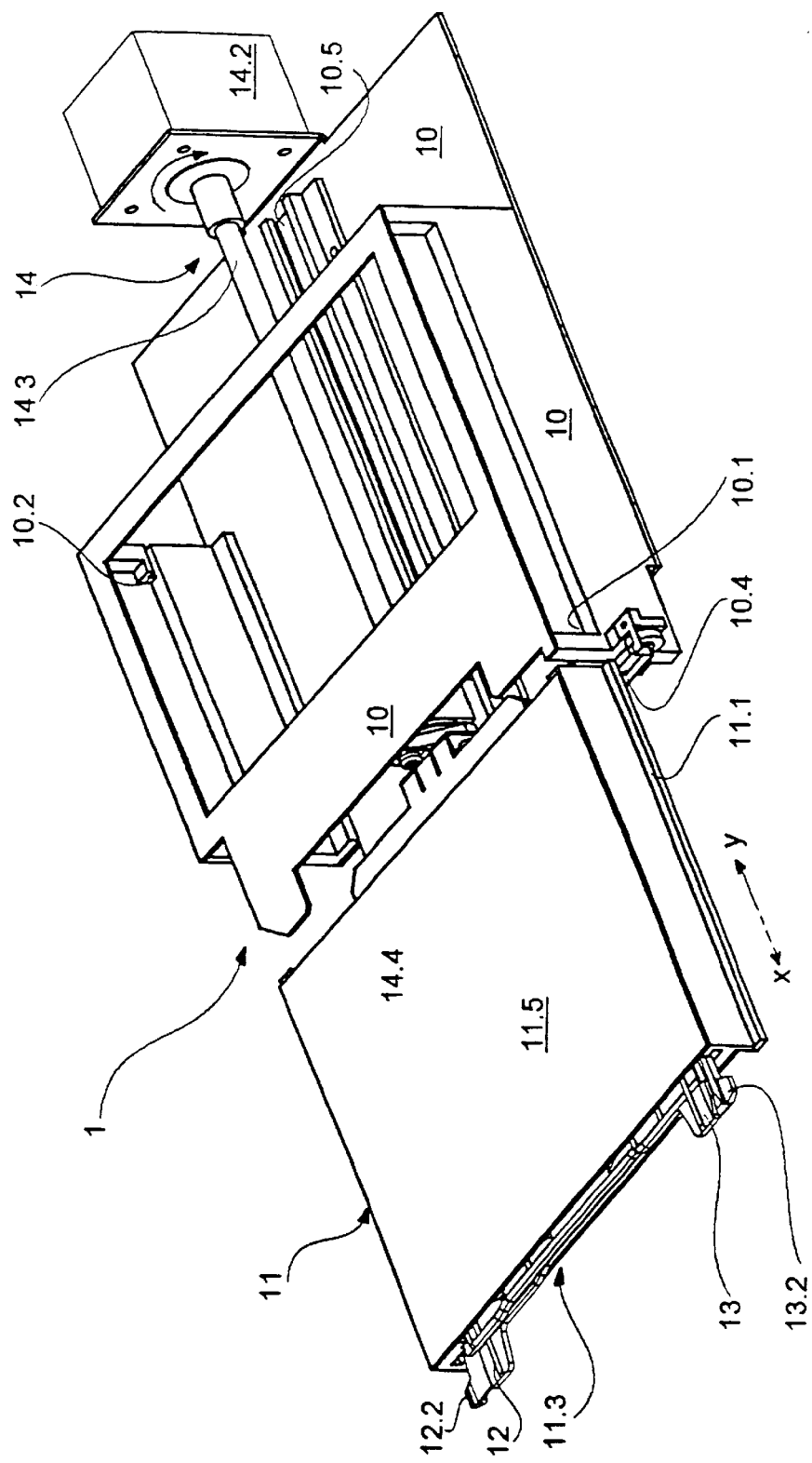
Figure 5:
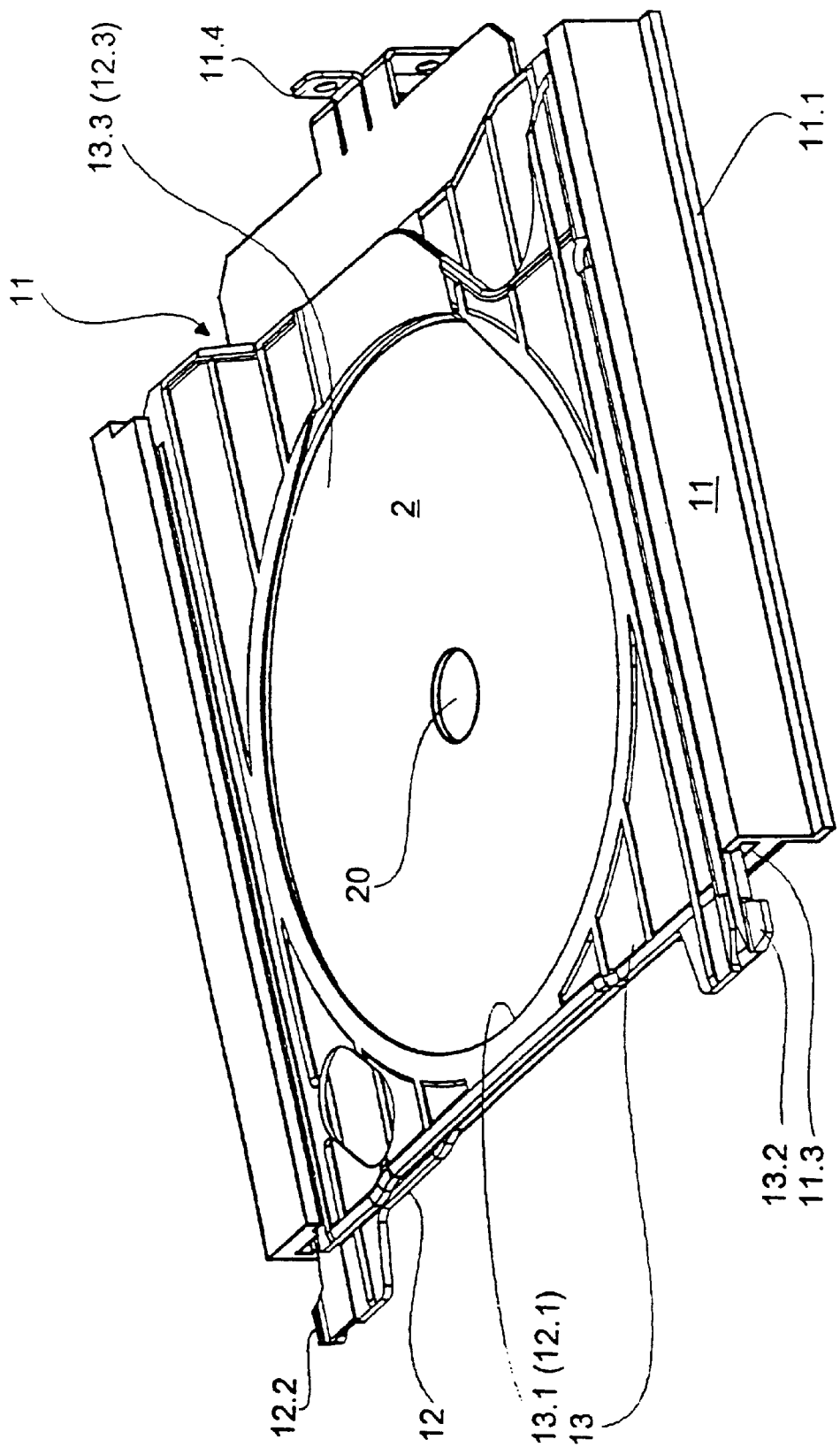
FIG. 5 illustrates the turning frame according to FIGS. 2 and 4 without the housing of the device and without the cover plate in the initial position with two trays one above the other and the information carrier between them.

To that end, the conveying means 6 has a conveying wheel (not shown) and the trays 12; 13 each have, as shown in FIGS. 2 to 5, a rack 12.2, 13.2 on opposite side edges and along their movement track, with the respectively undermost tray 12; 13 in a predetermined horizontal working position aligned with and engaged with the conveying wheel is movable out of an input/output opening 11.3 of the turning frame 11 before and after turning such that a Compact Disc 2 can be removed from/placed inside the storage recess 12.1; 13.1 of the respective tray 12; 13 by means of the gripper 7. The trays 12; 13 have, as shown in FIG. 5, the turning frame 11 without cover plate 11.5 and at their bottom parts in the area of the storage recesses 12.1; 13.1 a penetration 12.3 and 13.3 respectively, to permit pickup/setting down of a Compact Disc through its central hole 20 by means of a gripper head (not shown) of the gripper 7. Furthermore, the turning frame 11 has in its interior laterally arranged guide and engaging/holding and (not shown) for the trays 12; 13 to ensure precise positioning of the trays inside the turning frame and to prevent the trays from falling out or being completely removed from the turning frame.

Figure 2:
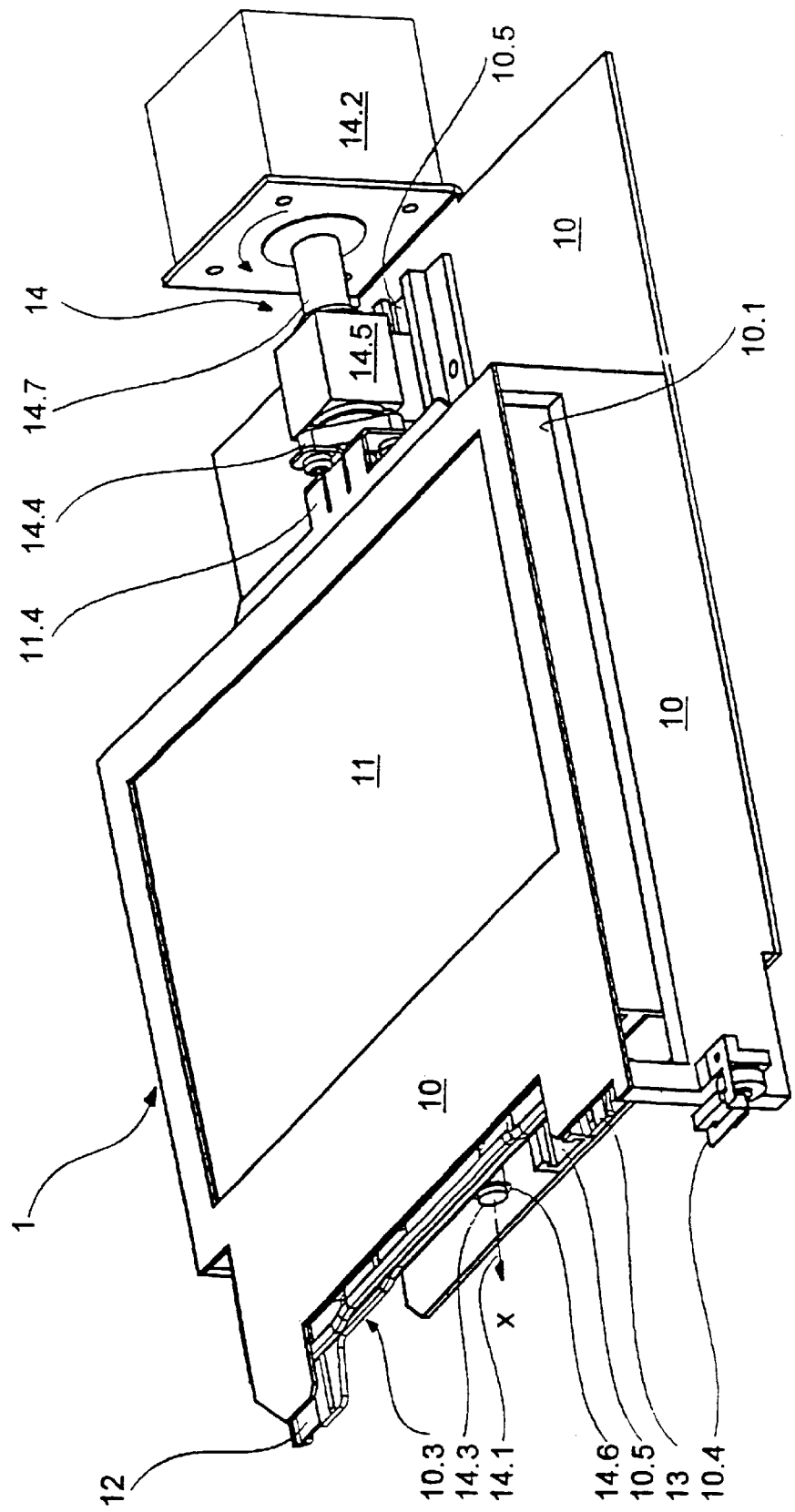
FIG. 2 illustrates the device according to FIG. 1 in a pictorial view without apparatus, with a turning frame carrying two trays in an initial position inside the housing of the device and in a position ready for moving out the lower tray.

The turning frame 11 is, as shown in FIGS. 2 to 4, movable by means of a controllable spindle drive 14 arranged in the housing 10 along the conveying directions X, Y of the trays 12; 13 out of the housing 10 (in X) and back (in Y) to the respective end positions. The frame rotatable or swivelable about a longitudinal central axis 14.1 of the spindle drive 14 in a moved-out end position in 180° steps in the Z direction, vertical to the conveying direction, such that with the trays 12; 13 moved into the turning frame 11, the information carrier 2 or CD present in a storage recess 12.1 of a lower first tray 12 is transferable during rotation or swivel of the turning frame 11 under its own weight from the upward-swiveled first tray 12 to the downward-swiveled second tray 13.

The turning frame 11 and hence the respective lower tray 12 or 13 is, as shown in FIGS. 2 to 4, in its horizontal working position alternatively above or below the spindle drive 14 after each turn of the turning frame 11, with the conveying means 6 being movable into the respectively required height position by means of the transport mechanism 8 controlled by a sensor (not shown) and the apparatus control unit.

In a further alternative embodiment, not shown, of the turning device 1, the turning frame 11 and hence the respectively lower tray 12 or 13 are after every turn of the turning frame in their horizontal working positions constantly at the level of the longitudinal central axis 14.1 of the spindle drive, where the turning frame 11 arranged centrally at the front of the spindle 14.3 pointing in the move-out direction X is moved in/out by means of axial movement of the spindle 14.3 by a spindle nut 14.5 fixed on the housing 10. In order to permit axial movement of the spindles, a further spindle nut designed as a gear and rotatably connected to the fixed spindle nut is provided at the drive-side end of the spindle and is drivable by means of a pinion of the drive motor. The spindle 14.3 is here freely rotatable relative to the turning frame 11 as a result of a bearing point between the front of the spindle and the housing-internal end of the turning frame, with the bearing point having a friction torque such that the turning frame 11 in its position moved out of the housing 10 is swivelable 180° against the stop 10.4 by means of the rotary movement of the spindle.

As shown in FIGS. 2 to 4, the spindle drive 14 has a rotatable spindle 14.3 driven by a drive motor 14.2 and permanently in its axial position, and on which are arranged two interconnected spindle nuts 14.4 and 14.5 rotatable against one another. The spindle 14.3 is in an operative connection with the turning frame 11 by means of the first spindle nut 14.4, and with a guide rail 10.5 parallel to the spindle and inside the housing 10 by means of the second spindle nut 14.5. The first spindle nut 14.4 is rigidly connected to the turning frame 11 and the second spindle nut is arranged movable back and forth in the guide rail 10.5 in the conveying direction of the turning frame by means of the spindle. Thus, when the spindle 14.3 is rotated, the turning frame is movable in and out depending on the rotation direction of the spindle.

The drive motor 14.2, which is a DC motor or stepping motor, for example, is controllable by means of the apparatus control unit in conjunction with or without a further sensor (not shown) in its rotation direction, with the rotation direction changeover being possible each time the inner and outer limit positions of the turning frame 11 are reached. The end positions of the turning frame are here limited in their stroke by an annular disk 14.6 on the outer end of the spindle 14.3 facing the input/output opening of the housing, and by a sleeve 14.7 or flange on the inner end of the spindle facing the drive motor 14.2.

The turning frame 11 is movable along the spindle 14.3 during movement out of the housing 10 unit it is completely out of the housing and pressed against the movement-limiting annular disk 14.6. By continuing to turn the spindle 14.3, the turning frame is swivelable or rotatable, depending on a friction moment between the first spindle nut 14.4 and the spindle 14.3.

In order to keep the turning frame 11 inside the housing 10 and in its working position during its X; Y conveying movement in both turning positions and to prevent rotation or swiveling of the turning frame 11, the housing 10 has in its interior guides 10.1; 10.2 on both its inner sides, which extend in the conveying direction and which engage with guides 11.1; 11.2 on the outsides of the turning frame 11. In an alternative embodiment, not shown, only one guide is provided.

The housing 10 has, as shown in FIGS. 2 to 4, at its input/output opening 10.3 a stop 10.4 arranged on an outer side wall facing away from the conveying means 6 for the moved-out turning frame 11, by which the turning frame 11 with the trays 12; 13 can be held in its working position after its swivel in the Z direction and during the start of its movement in the Y direction. Th stop 10.4 is spring-elastic in the swivel direction Z of the turning frame 11 and rigidly designed against the swivel direction, such that the turning frame runs, shortly before the end of its turn in the Z direction, from underneath onto the spring-elastic stop 10.4 9 e.g. leaf spring) by means of its lateral guide web 11.1 or 11.2, presses this stop aside, and then comes to rest above the stop. During subsequent movement of the turning frame 11 into the housing 10, the guide web 11.1 or 11.2 runs onto the now rigid stop 10.4 in the opposite direction as a result of the spindle 14.3 of the spindle drive 14 now rotating against the swivel direction Z, thereby preventing swiveling of the turning frame 11 before it enters the housing 10. For recognition or detection of the working position of the turning frame by the apparatus control unit, a sensor (not shown) is arranged near the stop 10.4 and is actuatable by means of the guide web 11.1 or 11.2.

Reference numerals:
X move-out direction of the turning frame or its tray
Y move-in direction of the turning frame or its tray
z turning direction of the turning frame
1 turning device
2 information carrier (e.g. Compact Disc)

3 function unit (e.g. magazine for Compact Discs)
4 function unit (e.g. playback/recording drive)
5 apparatus (e.g. playback/recording apparatus for Compact Discs)
6 conveying means in apparatus (for trays of turning device/function unit)
7 gripper inside apparatus (for Compact Discs)
8. transport mechanism inside apparatus (for transport and gripping units)
10 housing/holding frame of turning device
10.1 guide inside housing (for turning frame)
10.2 guide inside housing (for turning frame)
10.3 input/output opening of housing (for turning frame)
10.4 stop on opening of housing (for turning frame)
10.5 guide rail in housing (for second spindle nut)
11 turning frame of turning device
11.1 guide on turning frame (for guide on housing)
11.2 guide on turning frame (for guide on housing)
11.3 input/output opening of turning frame (for trays)
11.4 fastening party of turning frame to 1st spindle nut
11.5 cover plate of turning frame
12 first tray in turning frame
12.1 storage recess (e.g. for Compact Disc)
12.2 rack on 1st tray
12.3 penetration in bottom of tray/storage recess
13 second tray in turning frame
13.1 storage recess (e.g. for Compact Disc)
13.2 rack on 2nd tray
13.3 penetration in bottom of tray/storage recess
14 spindle drive inside housing of turning device
14.1 longitudinal central axis of spindle drive/spindle
14.2 drive motor of spindle drive; spindle
14.3 spindle of spindle drive
14.4 first spindle nut connected to turning frame
14.5 second spindle nut for guide rail in housing
14.6 annular disk on spindle (stroke limitation for turning frame)
14.7 sleeve/flange on spindle (stroke limitation for turning frame)
20 central hole of information carrier (e.g. Compact Disc)
30 tray of function unit (magazine)
40 tray of function unit (playback/recording drive)
50 holder inside apparatus for turning device
51 holder inside apparatus for function unit (e.g. magazine)
52 holder inside apparatus for function unit (e.g. magazine)
53 holder inside apparatus for function unit (e.g. magazine)
54 holder inside apparatus for function unit (e.g. playback/recording drive)
55 apparatus housing
56 apparatus door
80 transport drive
81 transport spindle
82 carrier or slide for conveying and grippers.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. An apparatus for turning double-sided information carriers, comprising:

a plurality of function units, each function unit having at least one tray for carrying an individual one of the information carriers;

a conveying device which moves trays in and out of the function units;

a gripper which grips an information carrier in a tray moved out of a function unit;

a turning device including a turning frame arranged to turn an information carrier supplied by the gripper, wherein the turning device further includes two trays positioned one above the other and facing one another inside the turning frame, the two trays having storage recesses and are alternately movable in and out of the turning frame by the conveying device; and a spindle drive which moves the turning frame in and out of a housing of the turning device and rotates the turning frame about a longitudinal central axis of the spindle drive when the turning frame is out of the housing of the turning device.

2. An apparatus according to claim 1, further comprising a plurality of holders, wherein the function units and the turning device are changeably installable in a respective one of the holders.

3. An apparatus according to claim 1, wherein a first of the two trays is moved out of the turning frame by the conveying device when the turning frame is moved into the housing of the turning device, such that an information carrier can be removed from and/or placed inside the storage recess of the first tray by the gripper.

4. An apparatus according to claim 1, wherein the housing of the turning device has in its interior at least one guide which prevents the turning frame from rotating while the turning frame moves in and out of the housing of the turning device.

5. An apparatus according to claim 1, wherein the housing of the turning device has at an opening a stop for the moved-out turning frame, by which the turning frame can be prevented from rotating after the rotation of the turning frame and during the movement of the turning frame back into the housing of the turning device.

6. An apparatus according to claim 1, wherein the spindle drive has a spindle driven by a drive motor and two interconnected spindle nuts rotatable against one another, the spindle being in an operative connection with the turning frame by means of the first spindle nut and with a guide rail of the housing by means of the second spindle nut.

7. An apparatus according to claim 1, wherein the information carrier gripped by the gripper is transportable by a transport mechanism carrying the conveying device and the gripper to one of the function units and to the turning device.

8. An apparatus according to claim 1, wherein the function units of the apparatus include a playback/recording drive.

9. An apparatus according to claim 1, wherein the function units include a magazine.

10. An apparatus according to claim 1, wherein the function units include an input/output drawer for the information carriers.

11. An apparatus according to claim 1, wherein said information carriers include compact discs.

12. An apparatus according to claim 1, wherein the spindle drive moves the turning frame in 180° steps such that with the two trays moved into the turning frame, an information carrier present in a storage recess of a lower first tray is transferable during the rotation of the turning frame under its own weight from the first tray rotated upward to a second tray rotated downward.

* * * * *